United States Patent [19]

Barnoin et al.

[11] Patent Number: 4,473,203
[45] Date of Patent: Sep. 25, 1984

[54] DISENGAGEABLE CONTROL COLUMN FOR A COPILOT OF AN AIRCRAFT

[75] Inventors: Pierre Barnoin, Eguilles; Jacques M. Cas, Marseilles, both of France

[73] Assignee: Societe Nationale Industrielle et Aerospatiale, France

[21] Appl. No.: 482,172

[22] Filed: Apr. 5, 1983

[30] Foreign Application Priority Data

Apr. 7, 1982 [FR] France .................................. 82 06083

[51] Int. Cl.³ ........................ B64C 13/12; B64C 13/14
[52] U.S. Cl. .................................... 244/224; 244/229;
244/234; 74/480 R; 74/527
[58] Field of Search ............... 244/220, 221, 224, 229,
244/234, 237; 74/480 R, 527, 471 XY; 403/92,
93, 96, 102

[56] References Cited

U.S. PATENT DOCUMENTS

| 1,304,420 | 5/1919 | Verner | 244/229 |
| 1,746,762 | 2/1930 | Braun | 244/229 |
| 1,809,936 | 6/1931 | Hilburn | 244/229 |
| 1,821,581 | 9/1931 | Rosatelli | 244/229 |
| 2,967,681 | 1/1961 | Berquist | 244/224 |
| 3,212,740 | 10/1965 | Greenberg | 403/96 |
| 3,827,313 | 8/1974 | Kiessling | 74/471 XY |

FOREIGN PATENT DOCUMENTS

| 443736 | 7/1912 | France | 244/237 |
| 546276 | 11/1922 | France | 244/234 |
| 967552 | 11/1950 | France | 244/234 |

Primary Examiner—Galen L. Barefoot
Attorney, Agent, or Firm—McGlew and Tuttle

[57] ABSTRACT

The invention relates to a control column (2) for a copilot of an aircraft, coupled for control of roll and pitch by a linkage (5) to the pilot's control column (1). This linkage comprises two parallel rods (6,7) pivoted on the one hand to the column (1) and on the other hand to a member (13) connected to the column (2) by a double universal joint (14, 17). When operative, the column (2) is locked to the member (13) by a lock bolt (19). This control column can be put out of action by releasing the said bolt and can be secured by hooking to a fixed point, in which case the double universal joint (14, 17) ensures its disconnection from the column (1) and thus prevents any misoperation.

7 Claims, 4 Drawing Figures

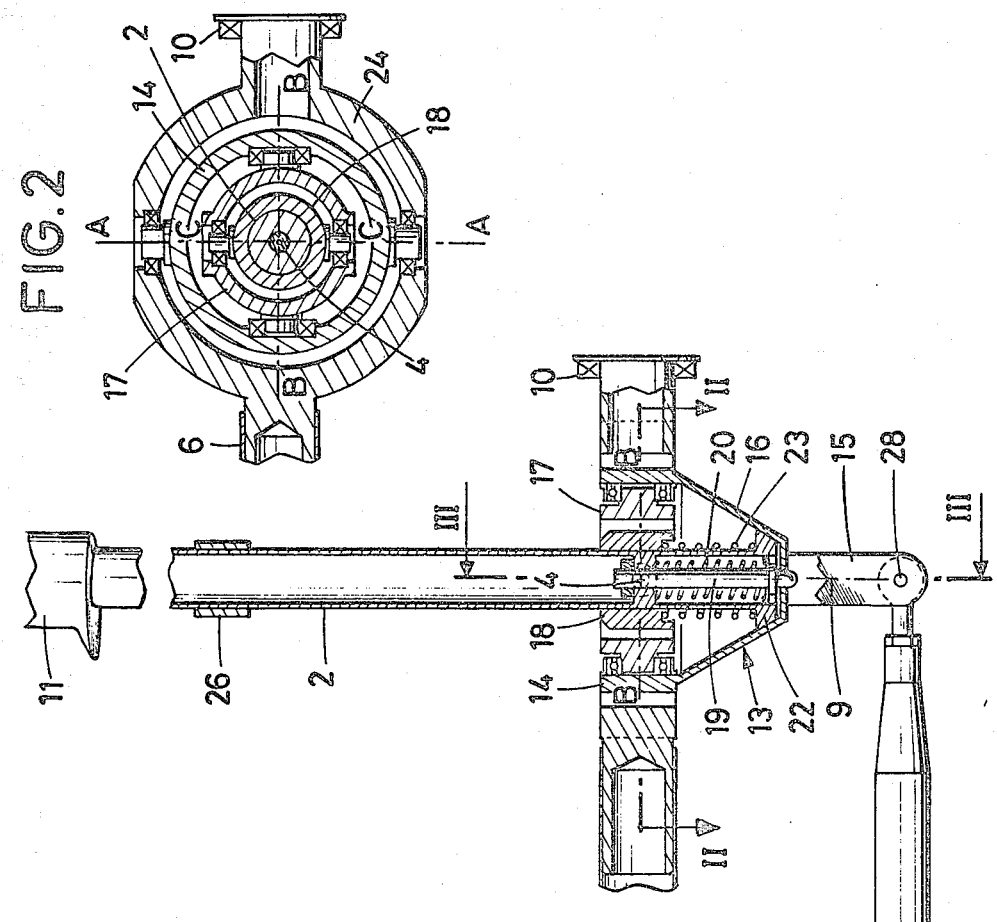
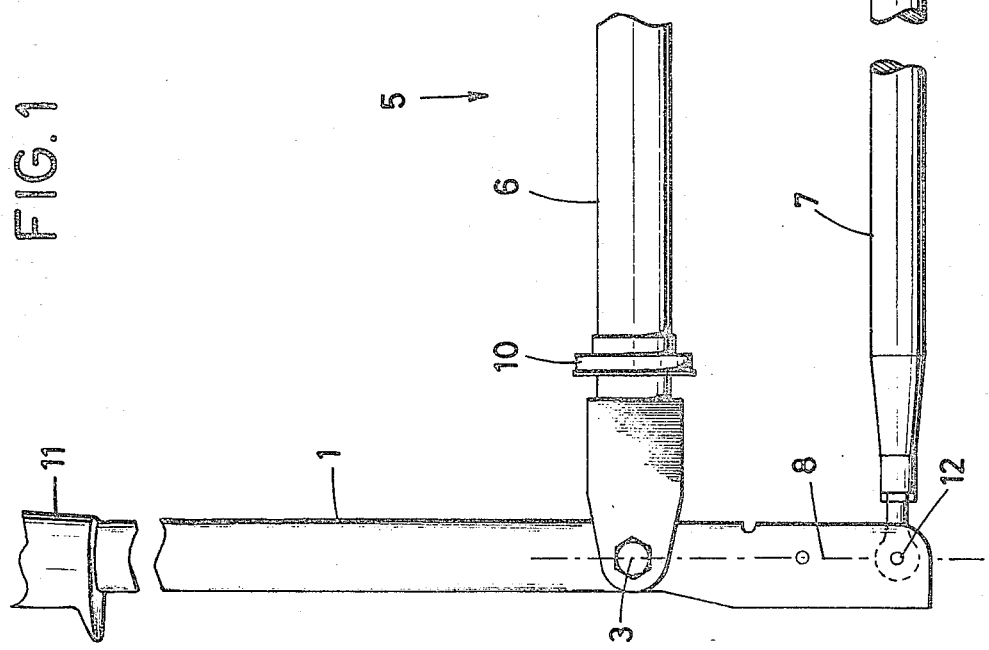

DISENGAGEABLE CONTROL COLUMN FOR A COPILOT OF AN AIRCRAFT

BACKGROUND OF THE INVENTION

The invention relates to a control column for a copilot of an aircraft (such as a helicopter), which control column is connected to the pilot's control column by a coupling linkage which forces the two control columns to remain parallel when they are displaced angularly about their respective pivot centers and which comprises two articulated parallel rods forming, with the longitudinal axes of the control columns, a deformable parallelogram, one of these rods, whose articulation points coincide with the pivot centers of the control columns, being a shaft rigid in torsion and adapted to turn in bearings, and the other rod being a connecting rod working in tension or in compression.

PRIOR ART

In dual-control aircraft fitted with a pilot's control column and a copilot's control column it may be troublesome, and even in some cases dangerous, if when the copilot is not piloting the aircraft and is occupied with other tasks, for example searching for targets or navigation, the control column situated in front of him cannot be completely disengaged from the main linkage in order to avoid jolts in the piloting of the aircraft if this control column, which is generally very sensitive, should be accidentally moved by the copilot.

SUMMARY OF THE INVENTION

The present invention relates to a copilot's control column equipped with an instantaneous disengagement and engagement mechanical device which prevents the accidental displacement of the control column, while enabling the copilot to intervene at any time in accordance with the requirements of the mission.

To this end, according to the invention a double universal joint is interposed between the rods of the aforesaid coupling linkage and the copilot's control column, this double universal joint comprising an outer ring and an inner ring and the two articulation axes of the said rings intercrossing at the pivot center of the said control column, its outer ring being articulated to the aforesaid shaft, on the one hand, and on the other hand being fastened to a member articulated on the aforesaid connecting rod, while the said control column is connected to the said member by a releasable locking device which makes it possible to fasten together and unfasten at will the control column and the outer ring of the double universal joint. When they are fastened together, the copilot's control column is coupled to the pilot's control column and permits normal piloting of the aircraft. When the copilot's control column is disconnected from the said outer ring, the double universal joint completely separates this control column from the pilot's control column, so that the copilot's control column is thus put out of action since the linkage can then operate only through the action of the pilot's control column.

In one advantageous embodiment the locking device for the copilot's control column comprises a bolt projecting coaxially from the end of the control column and engaging for locking purposes in a keeper formed in the bottom of a bowl-shaped part of the said member fastened to the outer ring, while the control column can slide longitudinally in the double universal joint, unlocking being effected by pulling the control column in such a manner as to move the bolt out of the keeper.

It is preferable to arrange for the copilot's control column, when unlocked, to be able to be secured, by means of a hooking device, to a fixed point on the structure of the aircraft. A hooking device of this kind may comprise a hook fastened to the control column and a fixed anchoring means with which the hook can be brought into engagement. The control column according to the invention is preferably equipped with a return spring imparting to it a resilient force holding it either in the locked position or in the hooked position after unlocking. In addition, it is advantageous for the bowl forming part of the said member fastened to the outer ring to have internally a frustoconical shape, and for the control column to have at its end a terminal portion of matching shape which fits accurately into the bottom of this bowl. Moreover, it is expedient for the lock bolt to be movable and to be adapted to retract into the control column when driven in against the action of a return spring urging it out of the end of the control column.

BRIEF DESCRIPTION OF THE DRAWINGS

The following description, given with reference to the accompanying drawings illustrating a non-limitative example, will make it easy to understand how the present invention can be put into practice.

FIG. 1 shows in elevation a dual-control arrangement for an aircraft, the copilot's control column being shown in longitudinal section.

FIG. 2 shows a section on the line II—II of the object shown in FIG. 1.

DETAILED DESCRIPTION OF THE PREFERRED EMBODIMENT

Figure 3:
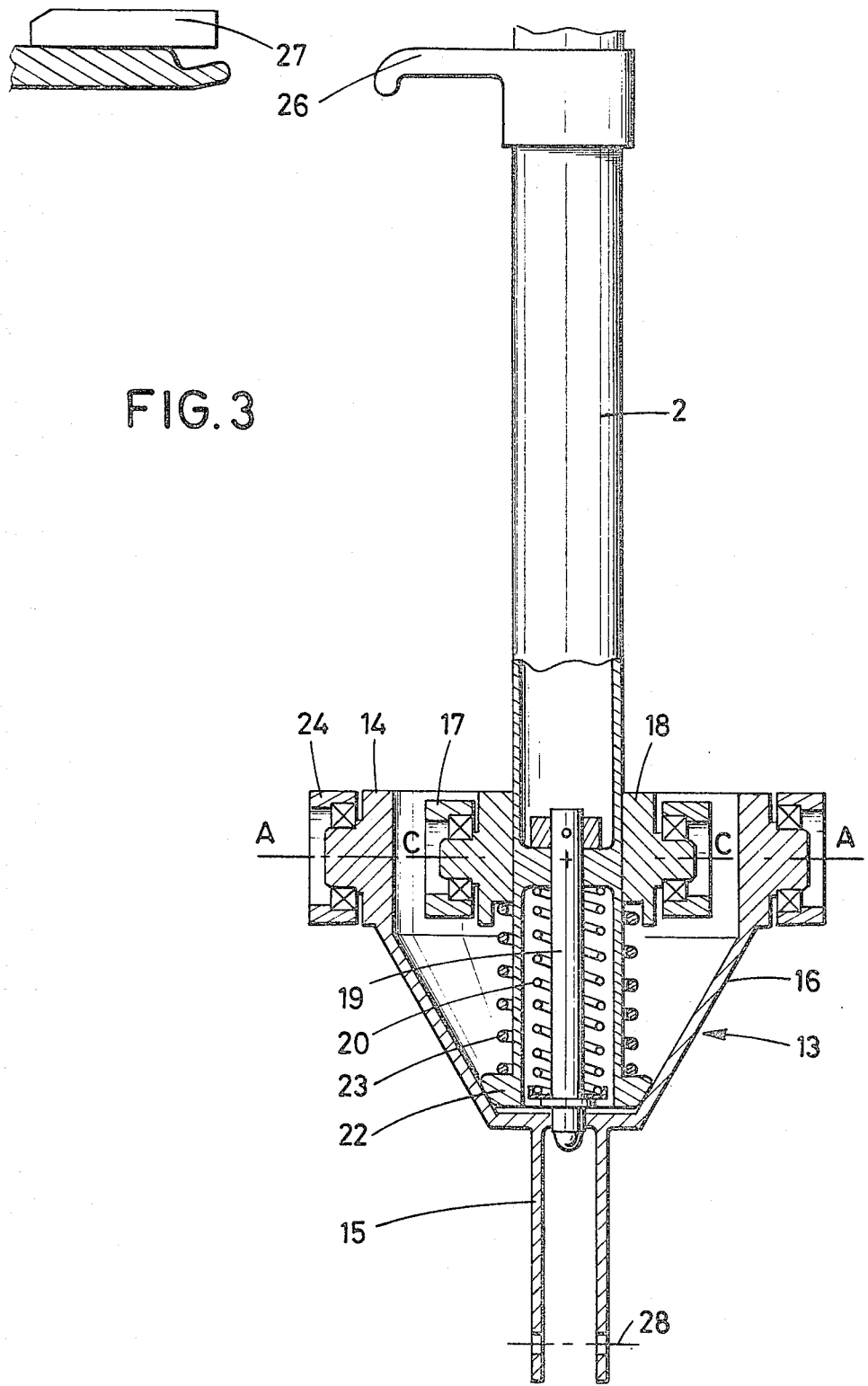
FIG. 3 shows a section on the line III—III of the object shown in FIG. 1, showing the copilot's control column locked in the operative position.

In FIG. 1 can be seen a cyclic control arrangement for a helicopter rotor, this arrangement comprising a control column 1 intended for the pilot of the aircraft and a control column 2 intended for the copilot. When in use, during which these control columns 1, 2 are moved angularly by operation of their respective handles 11, for control of roll or pitch, about their respective pivot centers 3, 4, they are constrained to remain parallel by means of a coupling linkage 5. This linkage comprises a pitch torque shaft 6 and a roll torque connecting rod 7, the shaft and the connecting rod forming with the axes 8, 9 of the control columns 1, 2 a deformable parallelogram.

The shaft 6, which is rigid in torsion and is adapted to turn in fixed bearings 10, is articulated to the control column 1 on an axis passing through the pivot center 3 of the control column 1, and the connecting rod 7 is articulated at 12 to the bottom end of the said control column.

At their other ends, on the other hand, the shaft 6 and the connecting rod 7 are articulated, not directly to the copilot's control column 2, but to an intermediate member 13 comprising at the top a universal joint ring 14 on which the shaft 6 is articulated, on an axis AA (FIG. 2), by means of a ring 24 fastened to the shaft 6, and at the bottom a fork 15 on which the connecting rod 7 is articulated at 28, the ring 14 and the fork 15 being joined together by a part 16 in the shape of a frustoconical bowl.

The ring 14 is connected to the control column 2 by a universal joint ring 17, which is articulated to the ring 14 on an axis BB and to a ring 18 surrounding the control column 2 on an axis CC at right angles to the axis BB. The rings 24, 14, 17 and 18 are concentric, and the axes AA, BB and CC all pass through the pivot center 4 of the control column 2.

The control column 2 is thus not articulated directly to the shaft 6, but is articulated to it by way of a double universal joint whose outer ring is the ring 17 and whose inner ring is the ring 14, the axes CC and AA being separate. However, during normal operation, these two axes are constrained to coincide through the fastening of the control column 2 and its ring 18 to the member 13 and its ring 14. This situation is obtained with the aid of a locking device consisting of a bolt 19 sliding coaxially inside the control column 2 and adapted to protrude from the end of the latter, under the action of a compression spring 20, in order to be engaged in a keeper formed by a hole 21 provided at the centre of the bottom of the bowl 16 of the member 13. Moreover, the control column 2 is mounted for sliding in the ring 18, its end, which is provided with a terminal portion 22 whose shape matches that of the bottom of the bowl 16, being applied against that bottom by a return spring 23 interposed between the ring 18 and the said terminal portion 22.

When the control column 2 and the member 13 are in a mutual locking situation (FIGS. 1 and 3), the axes AA and CC are necessarily in coincidence, the articulations of the ring 17 being out of action. The control column 2 is then articulated to the shaft 6 and to the connecting rod 7, as is the control column 1. The two control columns are coupled together, and either of them can be used to control the helicopter.

Figure 4:
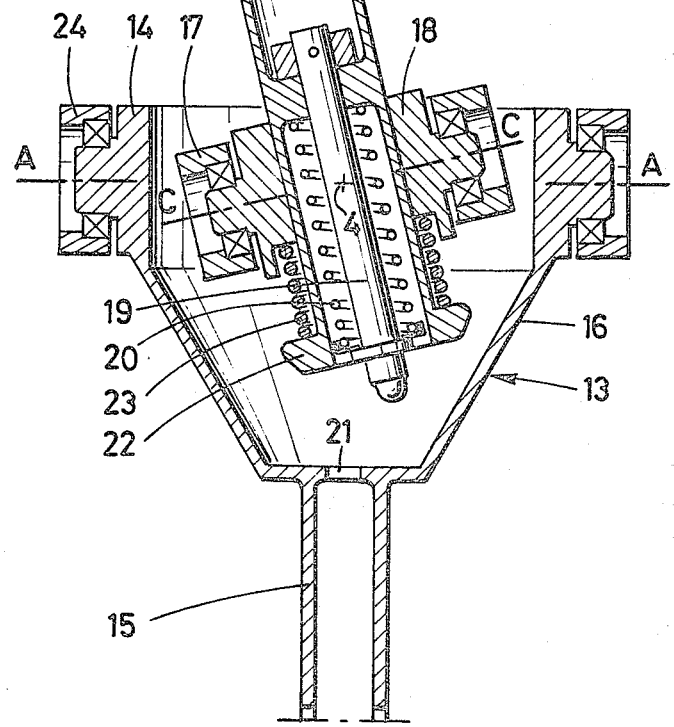
FIG. 4 shows, in a similar manner to FIG. 3, the copilot's control column unlocked and secured in the inoperative position.

When the copilot does not wish to make use of his control column 2, he pulls it upwards in the direction of the arrow 25 (FIG. 4), which, through the sliding of the control column 2 in the ring 18, has the effect of withdrawing the bolt 19 out of the keeper 21, the terminal portion 22 moving away from the bottom of the bowl 16. The control column 2 is thus disengaged, that is to say uncoupled from the control column 1, which can then alone be used for controlling the helicopter, while the shaft 6 and the connecting rod 7 can move freely, carrying with them the member 13 but not the control column 2, which is disconnected from them by the double universal joint 14, 17.

It is then expedient to secure the control column 2 in the unlocked position, which is achieved in the present example with the aid of a hooking device comprising a hook 26 fixed to the said control column at a certain height on its stem, together with a fixed anchoring means 27. The copilot inclines the control column 2 forwards to engage its hook 26 in the member 27. The return spring 23, having been compressed when the control column was pulled upwards, then holds the control column hooked to the member 27.

When the copilot wishes to resume the use of the control column 2, he has simply to pull it towards him. The hook 26 is released from the member 27 and the spring 23 expands, pulling down the control column, the terminal portion 22 of which effects automatic centering in the member 13, while the bolt 19, coming into contact with the wall of the bowl 16, is retracted and slightly compresses its spring 20 until it is positioned opposite the keeper 21, whereupon the said spring is expanded and pushes the bolt into the keeper. The control column 2 is thus locked again and back in its operative position. The control columns 1 and 2 are coupled and the linkage 5 functions when either of the control columns is operated.

What is claimed is:

1. A control column for a copilot of an aircraft, connected to the pilot's control column by a coupling linkage which forces the two control columns to remain parallel when they are displaced angularly about their respective pivot centers, and which comprises two articulated parallel rods forming, with the longitudinal axes of the control columns, a deformable parallelogram, one of these rods, whose articulation points coincide with the pivot centers of the control columns, being a shaft rigid in torsion and adapted to turn in bearings, and the other rod being a connecting rod working in tension or in compression, wherein a double universal joint is interposed between the rods (6, 7) of the coupling linkage (5) and the control column (2) itself, this double universal joint comprising an outer ring (14) and an inner ring (17), the two articulation axes (BB, CC) of which intercross at the pivot center (4) of the said control column, its outer ring (14) being articulated to the said shaft (6) on the one hand and on the other hand being fastened to a member (13) articulated on the said connecting rod (7), and wherein the control column (2) is connected to the said member (13) by a releasable locking device which makes it possible to fasten together and unfasten at will the control column (2) and the outer ring (14) of the double universal joint.

2. A control column as claimed in claim 1, wherein the locking device comprises a bolt (19) protruding coaxially from the end of the control column (2) and engaging for locking purposes in a keeper (21) formed in the bottom of a bowl-shaped part (16) of the said member (13) fastened to the outer ring (14), and wherein the control column (2) can slide longitudinally in the double universal joint (14, 17), unlocking being effected by pulling the control column (2) in such a manner as to move the bolt (19) out of the keeper (21).

3. A control column as claimed in claim 1 or 2, which, when unlocked, can be secured by means of a hooking device to a fixed point on the structure of the aircraft.

4. A control column as claimed in claim 3, wherein the hooking device comprises a hook (26) fastened to the control column (2) and a fixed anchoring means (27) with which the hook (26) can be brought into engagement.

5. A control column as claimed in claim 3, wherein a return spring (23) imparts to said control column (2) a resilient force holding it either in the locked position or in the hooked position after unlocking.

6. A control column as claimed in claim 2, wherein the bowl (16) forming part of the said member (13) fastened to the outer ring (14) has internally a frustoconical shape, and wherein the control column (2) has at its end a terminal portion (22) of matching shape, which fits accurately into the bottom of this bowl (16).

7. A control column as claimed in claim 2, wherein the bolt (19) is movable and is adapted to retract into the control column (2) when driven in against the action of a return spring (20).

* * * * *